(No Model.)
W. H. CLARK & H. C. KEEFER.
EARTH AUGER.
No. 483,300. Patented Sept. 27, 1892.
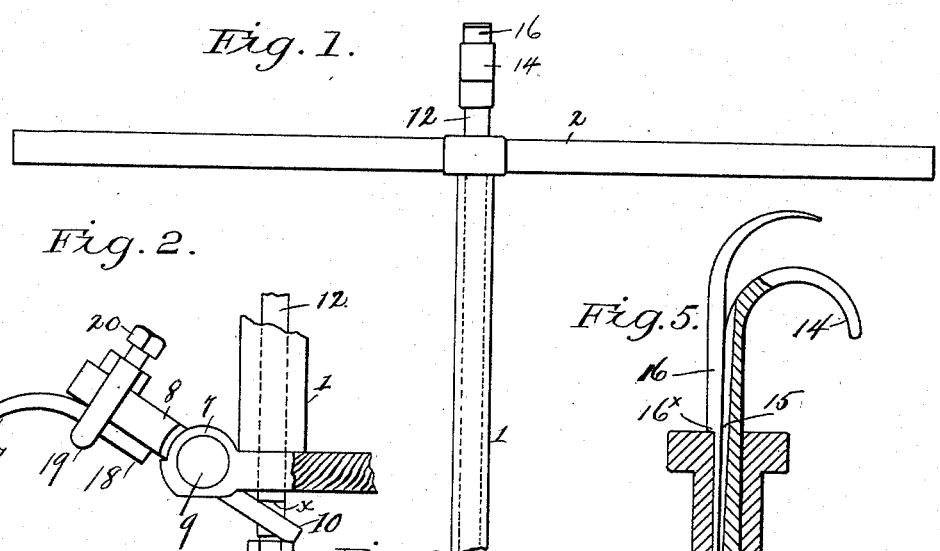
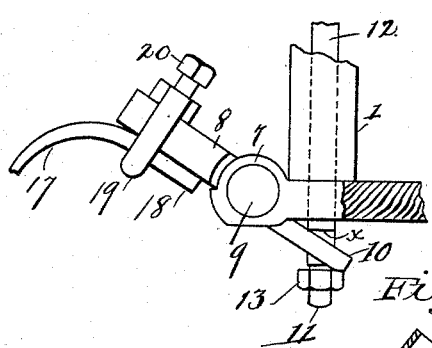
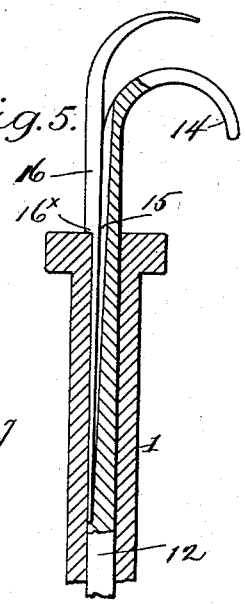
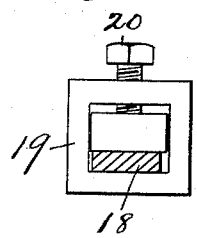
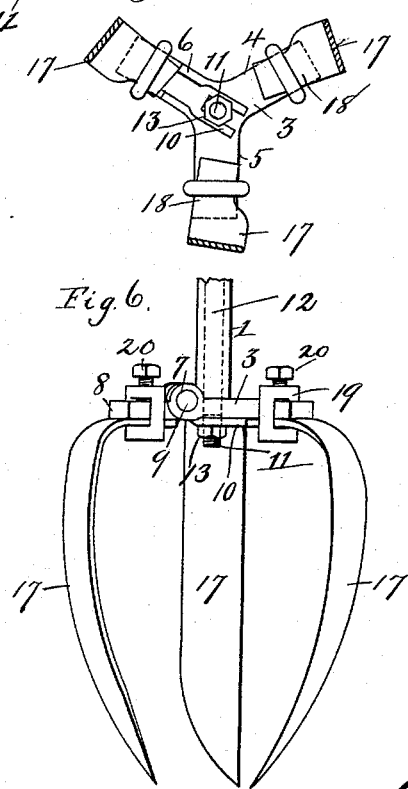
Witnesses
Inventors
Wm H Clark
Henry C Keefer
By their Attorney

UNITED STATES PATENT OFFICE.

WILLIAM H. CLARK AND HENRY C. KEEFER, OF KINGFISHER, OKLAHOMA TERRITORY.

EARTH-AUGER.

SPECIFICATION forming part of Letters Patent No. 483,300, dated September 27, 1892.

Application filed February 25, 1892. Serial No. 422,777. (No model.)

*To all whom it may concern:*

Be it known that we, WILLIAM H. CLARK and HENRY C. KEEFER, citizens of the United States, residing at Kingfisher, in the county of Kingfisher and Territory of Oklahoma, have invented certain new and useful Improvements in Earth-Augers; and we do hereby declare the following to be a full, clear, and exact description of the invention, such as will enable others skilled in the art to which it appertains to make and use the same.

Our invention relates to earth-augers, and more particularly to that class of augers having adjustable cutting-blades attached to a common support.

The primary object of the invention is to provide means for releasing the earth that may be collected within and adhere to the cutting-blades when boring in wet or damp ground.

A further object of the invention is to provide means for securing the cutting-blades fixedly during the operation of the boring, and thereby preventing the cutting of a hole of irregular shape.

The invention consists in improved mechanism for operating one of the cutting-blades and in the novel features of construction and combinations of parts hereinafter fully described, and pointed out in the appended claims.

In the accompanying drawings, Figure 1 is a side elevation of the upper part of the shank and its handle. Fig. 2 is a view, partly in section, illustrating the pivoted cutting-blade and its connection with the operating-rod. Fig. 3 is a bottom plan of the auger, the blades being partly cut away. Fig. 4 is a transverse section showing the devices for securing the cutting-blades in place. Fig. 5 is a central longitudinal section taken through the upper portion of the shank and operating-rod, and Fig. 6 is a side elevation of the auger with a part of the shank broken away.

The numeral 1 indicates the shank of the auger, which is hollow throughout its length and provided at its upper end with a handle 2. To the lower end of the shank 1 is secured a spider 3, preferably having three arms 4, 5, and 6. One of these arms 6 consists of two jointed sections 7 and 8. The part 7 consists of two perforated lugs, between which the part or arm proper 8 is secured by a pin 9. This arm 8 is provided with an inward extension 10, which is forked to receive the lower end 11 of the operating-rod 12, which is arranged within the shank 1, and screw-threaded at its lower end to receive a nut 13. The end of the rod is recessed above its screw-threads to form shoulders $x$, against which the forks of the extension 10 bear. The upper end 14 of the rod 12 is bent outwardly to form a finger-piece and is grooved at the point 15 to receive a spring-catch 16. This catch is secured at its lower end within the groove 15, and is formed with a shoulder $16^x$, adapted to engage the upper end of the shank, as shown in Fig. 5.

The cutting-blades 17 are each formed with a shank 18 and are each secured to an arm of the spider 3 by a yoke-clamp 19, which embraces the spider-arm and blade-shank, and a set-screw 20, which passes through the clamp and abuts against the arm of the spider. It will thus be apparent that the cutting-blades may be readily removed and replaced when desired.

When the blades are in the position shown in Fig. 1 the nut 13 will bear against the forked extension 10 of the arm 8, and thus hold the blade attached thereto in working position. This relation of the parts is maintained by the engagement of the catch $16^x$ with the upper end of the shank. When it is desired to raise the blade attached to the arm 8, the spring-catch 16 of the operating-rod is pressed out of engagement with the shank and said rod is forced downwardly, thus raising the outer end of the arm 8 and its attached blade and releasing the confined earth.

Having fully described our invention, what we claim as new, and desire to secure by Letters Patent, is—

1. The combination, with the hollow shank provided with a handle, of a spider having a pivoted arm provided with a forked extension 10, a sliding rod arranged within said shank and having a spring-catch at its upper end and a nut or head at its lower end, and cutting-blades removably secured to the spider by clamp-yokes 19 and set-screws 20, substantially as described.

2. The combination, with the hollow shank and spider, of cutting-blades provided with shanks and removably secured to the arms of the spider by clamp-yokes 19 and set-screws 20, substantially as set forth.

In testimony whereof we have affixed our signatures in presence of two witnesses.

WILLIAM H. CLARK.
HENRY C. KEEFER.

Witnesses:
F. S. ROGERS,
F. B. LINVILL.